Dec. 8, 1953  E. O. DALE  2,661,696
HYDRAULIC POWER UNIT AND INTERNAL-COMBUSTION ENGINE
WITH CLUTCH DRIVE THERE BETWEEN OPERATED
FROM THE OIL CIRCUIT OF SUCH ENGINES
Filed July 22, 1948  3 Sheets-Sheet 1
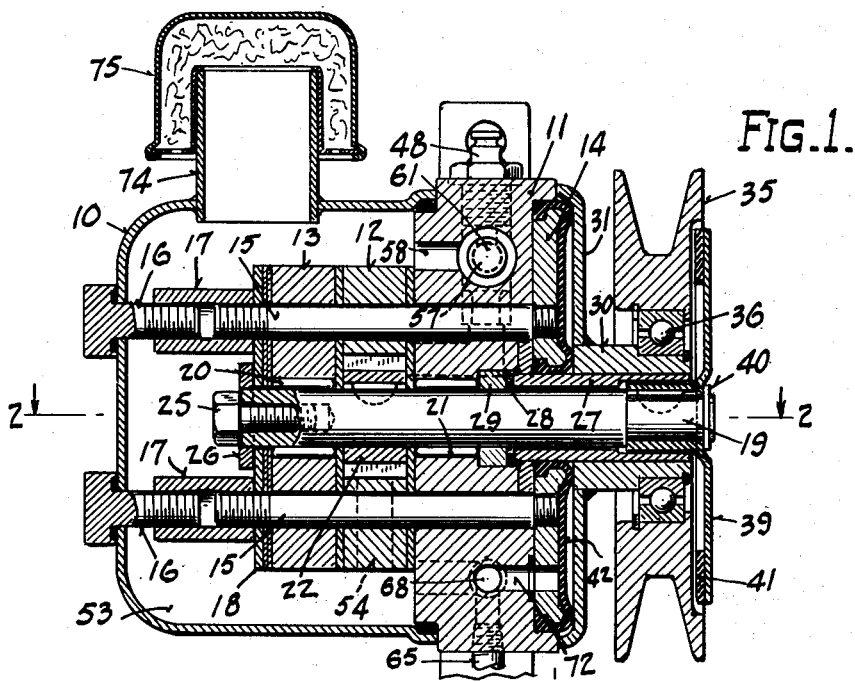
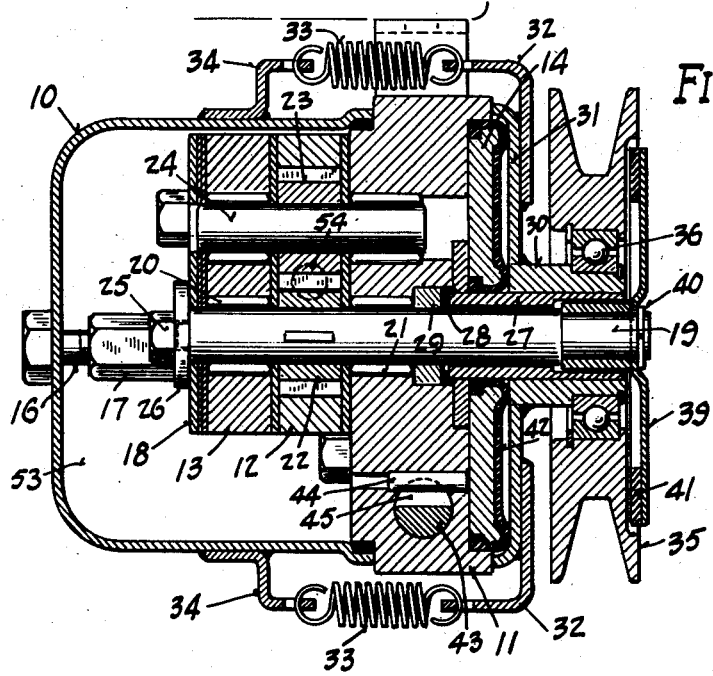
INVENTOR.
Elmer O. Dale
BY Andrus & Seealer
ATTORNEYS.

Dec. 8, 1953　　　　　E. O. DALE　　　　2,661,696
HYDRAULIC POWER UNIT AND INTERNAL-COMBUSTION ENGINE
WITH CLUTCH DRIVE THERE BETWEEN OPERATED
FROM THE OIL CIRCUIT OF SUCH ENGINES
Filed July 22, 1948　　　　　　　　　3 Sheets-Sheet 2
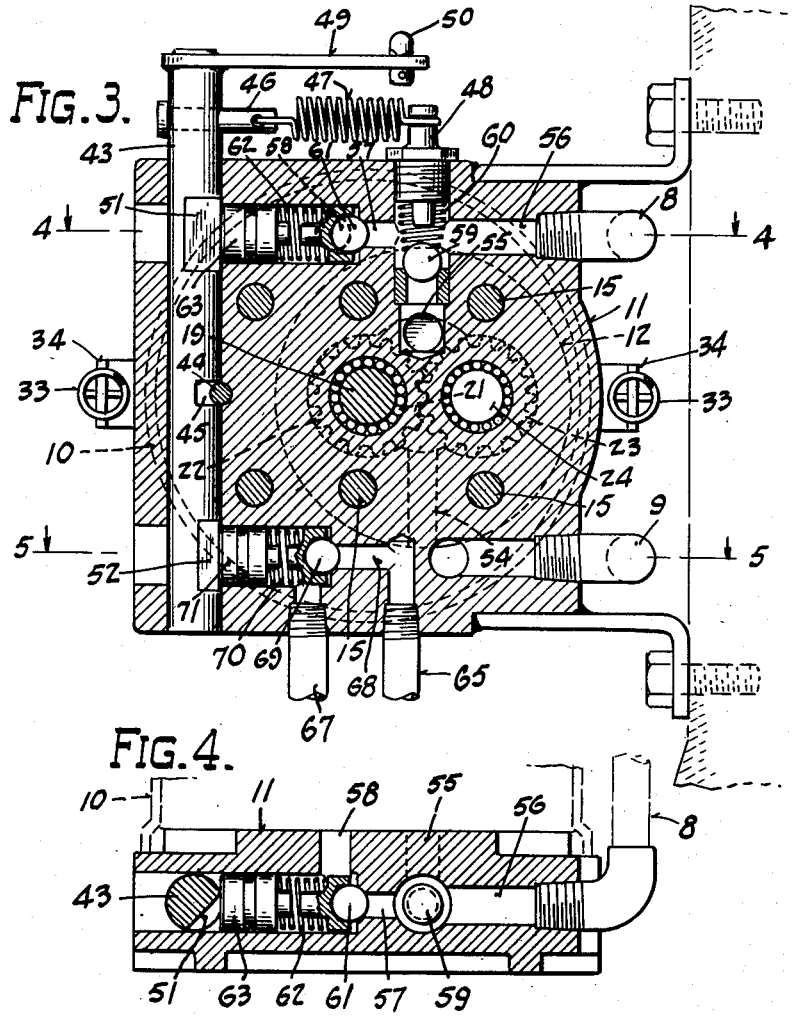
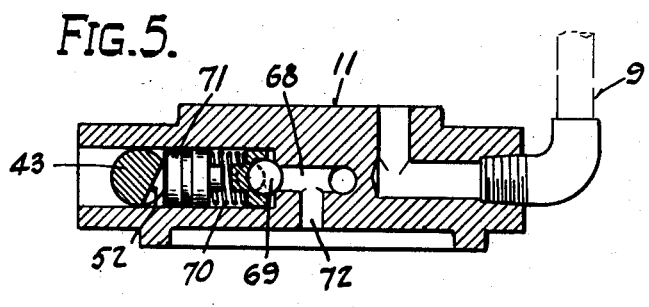
INVENTOR.
Elmer O. Dale
BY Andrus & Seealer
ATTORNEYS.

Dec. 8, 1953
E. O. DALE
2,661,696
HYDRAULIC POWER UNIT AND INTERNAL-COMBUSTION ENGINE
WITH CLUTCH DRIVE THERE BETWEEN OPERATED
FROM THE OIL CIRCUIT OF SUCH ENGINES
Filed July 22, 1948
3 Sheets-Sheet 3
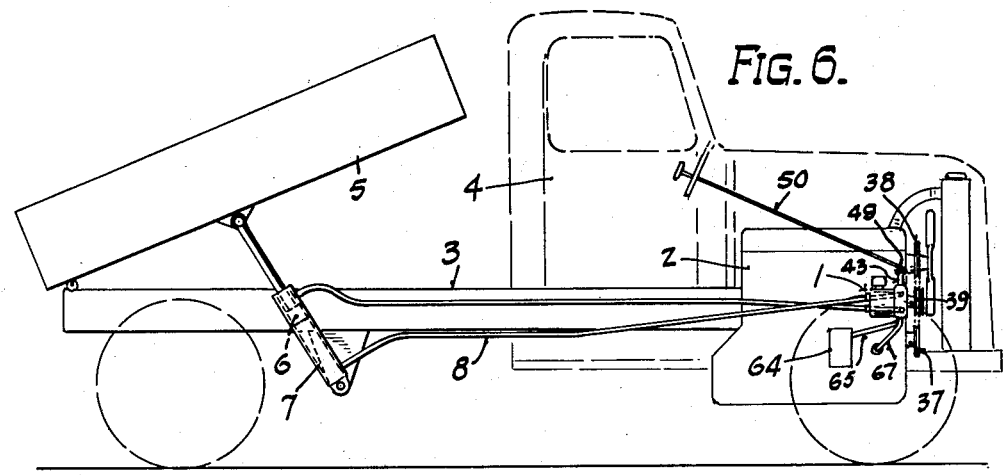
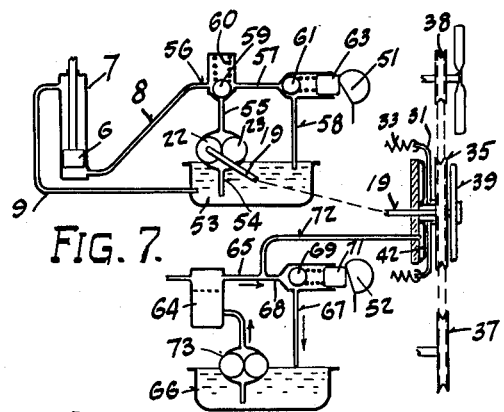
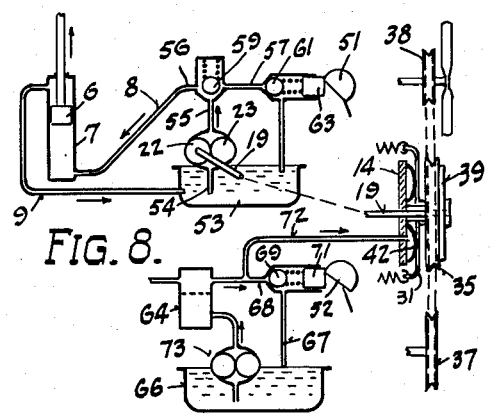
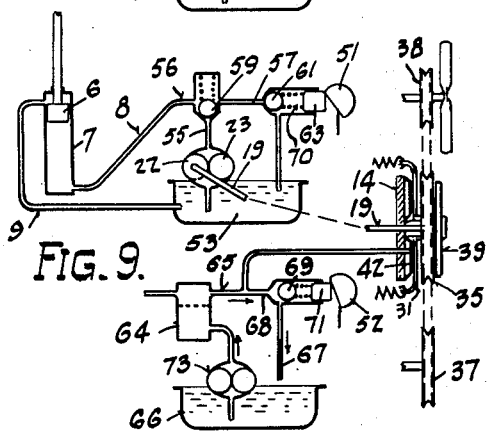
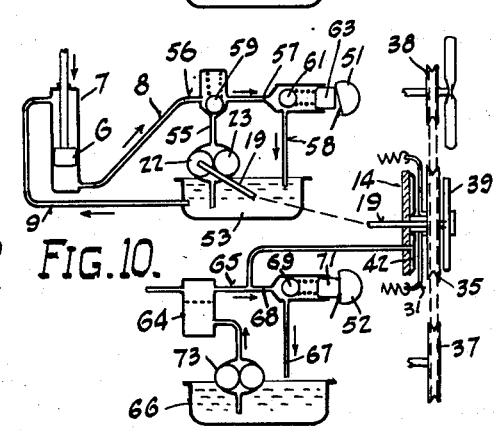
INVENTOR.
Elmer O. Dale
BY Andrus & Seales
ATTORNEYS.

Patented Dec. 8, 1953

2,661,696

UNITED STATES PATENT OFFICE 2,661,696

HYDRAULIC POWER UNIT AND INTERNAL-COMBUSTION ENGINE WITH CLUTCH DRIVE THEREBETWEEN OPERATED FROM THE OIL CIRCUIT OF SUCH ENGINES

Elmer O. Dale, Waukesha, Wis., assignor, by mesne assignments, to Gar Wood Industries, Incorporated, a corporation of Michigan Application July 22, 1948, Serial No. 40,030

7 Claims. (Cl. 103—23)

1

This invention relates to a hydraulic power unit and an internal combustion engine with a clutch drive therebetween actuated from the oil pressure in the oil filter circuit of such engine as is employed in a motor vehicle.

One object of the invention is to provide such a power unit in which the clutch thereof is selectively actuated from the oil pressure in the oil filter circuit of an engine to effect driving engagement of the pump of the unit with the engine.

Another object is to provide such a power unit actuated by the oil pressure in the oil filter circuit of an engine in which the pump of such unit is idle except during actuation of a hydraulic cylinder or other hydraulic devices to which the unit is applied to operate the same.

Another object is to provide such a power unit which is generally light in weight and compact and adaptable to be assembled with many different vehicle motors.

A further object is to provide such a power unit in which essential parts cannot be readily tampered with.

Another object is to provide such a power unit in which a single control member is employed to control the flow of the hydraulic oil of the unit and to utilize the oil pressure in the oil filter circuit of the engine with which the unit is assembled to place the pump of the unit in driving operation with the engine.

These and other objects of the invention will appear hereinafter in connection with the following description of an embodiment of the invention illustrated in the accompanying drawings.

In the drawings:

Figure 1 is a longitudinal sectional view of the power unit of the invention;

Fig. 2 is a view taken on line 2—2 of Fig. 1;

Fig. 3 is a sectional view of the unit looking towards the cab of the truck motor on which it is mounted;

Fig. 4 is a view taken on line 4—4 of Fig. 3;

Fig. 5 is a view taken on line 5—5 of Fig. 3;

Fig. 6 is an elevational view showing the power unit mounted on the engine of a dump truck;

Fig. 7 is a diagrammatic view showing the parts in normal position with the ram down;

Fig. 8 is a view similar to Fig. 7 with the parts in position for raising the ram;

Fig. 9 is a view similar to Fig. 7 with the parts in position for holding the ram in raised position; and Fig. 10 is a view similar to Fig. 7 with the parts in position upon lowering of the ram.

2

The invention is directed to a hydraulic power unit which is secured to the block of the internal combustion engine of a vehicle such as a dump truck to supply power to rams or hydraulic cylinders on the chassis of the truck to raise and lower the dump body. The pump of such unit is driven from the fan belt of the engine by a pulley on the front of the unit which freely rotates until it is clutched to the shaft of the pump by a clutch hydraulically actuated by the oil pressure in the oil filter circuit of the engine and controlled by the operator of the vehicle. It is comparatively simple to connect the power unit in the return line from the filter so that a valve in such unit can control the application of pressure in the filter circuit.

Referring to the drawings, for purposes of illustration, the power unit generally designated as 1 is shown as mounted by suitable brackets on the right side of the engine 2 of a dump truck comprising in general the chassis 3 supported on front and rear wheels and in turn supporting engine 2, cab 4 and a dump body 5.

The dump body 5 is raised as shown in Fig. 6 by a ram comprising the piston 6 and the cylinder 7 and the ram is suitably secured to truck chassis 3. Oil to actuate piston 6 for raising or lowering the dump body is supplied from pump 1 through the oil line 8 leading to the lower end portion of ram cylinder 7 and the upper end portion of the ram cylinder 7 is connected to a sump 53 by means of a line 9. During operation, the line 9 may be occupied by oil or by air, or both.

Power unit 1, in general, comprises a generally cylindrical casing 10 which is closed at the forward end by the valve body 11, and within which is contained the pump parts comprising generally the pump body 12 and pump end 13 assembled side by side next to valve body 11.

A retainer plate 14 fits within the outer circumferentially flanged end of valve body 11. A plurality of studs 15 extend longitudinally through pump end 13, pump body 12 and valve body 11 and are threaded into retainer plate 14. Screws 16 extend through the end of casing 10 and are threaded into sleeves 17 which in turn are threaded onto the ends of studs 15 into engagement with end plate 18 of pump end 13. When screws 16 are threaded home into sleeves 17 the casing, valve body, pump parts, and retainer plate are secured together. The employment of sleeves 17 permits a longer casing 10 to be employed if necessary.

The central drive shaft 19 of the pump extends longitudinally through valve body 11 and pump end 13 and pump body 12 and is supported for rotation in needle bearings 20 in pump end 13 and needle bearings 21 in valve body 11. The outer end of shaft 19 projects from valve body retainer plate 14 a substantial distance.

The gear 22 located in the pump body is keyed to shaft 19 and meshes with gear 23 keyed to idler shaft 24 which is supported for rotation by needle bearings in pump end 13 and valve body 11.

The screw 25 is threaded into the inner end of drive shaft 19 against the washer 26 disposed next to pump end plate 13 to prevent longitudinal outward movement of the shaft. The sleeve 27 is assembled over the outer projecting end portion of shaft 19 and a radial flange on the inner end of the sleeve fits within an opening provided therefor in valve body 11 underneath the retainer plate 14 so that the sleeve is confined by plate 14. A gasket 28 is provided next to sleeve 27 to prevent oil from leaking out of the clutch and the oil seal 29 is located inside valve body 11 around shaft 19 to seal off leakage of pump oil along the shaft.

The hub 30 is assembled over sleeve 27 and the flange 31 is welded to the inner end portion of the hub. Flange 31 projects radially outwardly of the hub and is turned inwardly at the outer edge to abut against the circumferential flange on valve body 11 located radially outwardly of retainer plate 14.

The radially spaced brackets 32 are welded to flange 31 and extend radially outwardly therefrom. One end of each spring 33 is secured to each bracket 32 and the other end of each spring 33 is secured to a bracket 34 which is welded to casing 10 and projects outwardly therefrom. Springs 33 normally bias flange 31 against valve body 11.

The pump pulley 35 rotates on ball bearings 36 which are assembled over the outer end portion of hub 30, and a split ring fitting in a groove on the outer end of hub 30 confines the pulley thereon.

Pulley 35 is rotated from engine 2 by the engine fan belt which engages the groove of the pulley and extends between engine pulley 37 and the fan belt pulley 38. Pulley 35 is rotated by the fan belt when the engine 2 is in operation but does not rotate shaft 19 until put into engagement therewith by the hydraulic clutch to be described and which is actuated by the oil pressure of the engine.

The clutch plate 39 of the hydraulically operated clutch has a hub which is keyed to the end portion of shaft 19 within sleeve 27, the sleeve being cut out for this purpose, and plate 39 is retained on the shaft end by a split ring 40 fitting in a groove on the outer end of shaft 19. The outer face of pulley 35 is recessed circularly so that plate 39 will fit within the pulley inside an outer circumferential flange. The rubber-like material 41 is secured to the inside of plate 39 at the periphery for engagement with pulley 35, as will be described.

The rubber diaphragm or bellows 42 of the hydraulically operated clutch is disposed between retainer plate 14 and the shifter flange 31. The outer end of the diaphragm is confined between the circumferential flange on the valve body 11 and the outer edge of retainer plate 14.

Outward movement of diaphragm 42 under pressure from the engine oil in the oil filter circuit of the engine, as will be described, forces the diaphragm against shifter flange 31 and the latter in turn is forced outwardly to force hub 30 with pulley 35 thereon outwardly to place pulley 35 into engagement with face material 41 on clutch plate 39. When this engagement is accomplished pulley 35 then rotates shaft 19 through the clutch plate 39 which is keyed to shaft 19 and the latter drives the pump. When the pressure on diaphragm 42 is released the pulley 35 is separated from plate 39 to permit the pulley to rotate free of shaft 19 by the tension of springs 33 previously described.

The control shaft 43 for operating the valves which regulate the flow of engine oil from the oil filter circuit to the diaphragm and the pump oil (hydraulic system oil) to the hydraulic ram extends vertically through one side of the valve body 11. The pin 44 extends horizontally through valve body 11 and the groove 45 on one side of shaft 43 to limit the rotary movement of shaft 43 and also retain the shaft within valve body 11.

The pin 46 extends horizontally through the exposed upper end portion of shaft 43. One end of spring 47 is secured to the end of pin 46 and the other end of spring 47 is secured to plug 48 which is threaded into the upper end of valve body 11.

The lever arm 49 is secured to the upper end of control shaft 43 and rod 50 extends from arm 49 to the dash board in cab 4 of the truck for rotation of the lever arm by the operator upon pushing or pulling the rod.

Control shaft 43 is provided internally of valve body 11 with the upper cam 51 and the lower cam 52. The upper cam is employed to operate the valve for controlling the flow of hydraulic oil from the pump to the ram while the lower cam operates a valve for controlling the flow of engine oil from the oil filter circuit to diaphragm 42.

The pump oil is stored in a reservoir such as the sump 53 inside the casing 10. Oil is pumped from the sump 53 through passage 54 in pump body 12 by the gears 22 and 23. It is then pumped through passage 55 and the passage 56 in valve body 11 at right angles to passage 55. The oil line 8 is threaded into valve body passage 56 and carries the pumped oil to the bottom of ram cylinder 7 to raise piston 6.

The passage 57 in valve body 11 in line with passage 56 and to the left of valve passage 55 in Fig. 3 is the return passage for oil flowing from the cylinder 7, when the piston 6 is lowered, and merges into the passage 58 at right angles thereto which discharges into sump 53 of the pump casing.

The check valve 59 is seated in the passage 55 leading from pump gears 22 and 23 by the spring 60 in turn seated on the inner end of the plug 48, the outer end of which is engaged by the spring 47 of the control shaft. When hydraulic oil is flowing from the pump to the ram, spring 60 is compressed and valve 59 is unseated in passage 55. Upon return of the oil from the ram, valve 59 seats and closes off passage 55.

Passage 58 which returns oil to sump 53 is closed to passage 57 by the cam valve 61 seated by spring 62. The opposite end of spring 62 is seated on the cam follower 63 which is engaged by the upper cam 51 of control shaft 43. The cam 51 places spring 62 under compression through follower 63 to hold valve 61 seated and close passage 58. Valve 61 is unseated to permit oil to flow through passage 58 to sump 53 by rotation of cam 51 to release spring 62 sufficiently for compression of the spring under pressure of the oil when piston 7 of the ram is lowering. It is only when cam 51 is rotated by the operator that valve 61 is unseated. As soon as the lever arm 49 is released spring 47 automatically rotates the control shaft 43 to a position where valve 61 is seated. This permits holding the piston 6 in the ram at any position without the operator retaining hold of the lever rod 50.

A portion of the oil of engine 2, as is well known in the automotive industry, continuously flows through a filter circuit which includes the filter 64, as shown in Fig. 6. In the illustrated embodiment, this circuit is of the type which diverts only a small amount of oil from the lubrication circuit (not shown) so that a clogging of the filter does not effect the lubrication circuit. The oil which flows through the filter circuit is utilized to operate the diaphragm 42 of the hydraulic clutch to clutch the pump pulley 35 to shaft 19 and rotate the pump gears to supply hydraulic oil to the ram or hydraulic cylinder.

The engine oil of the filter circuit circulates from the engine pump 73 to the filter 64, thence through pipe 65 to the valve body 11 and passage 68 and returns to the engine sump 66 by means of pipe 67. The flow of oil through the passage 68 is stopped by the valve 69 which is seated in the passage by means of spring 70 seated thereagainst. The opposite end of spring 70 is seated on the cam follower 71 which is engaged by the lower cam 52 of control shaft 43. When spring 70 is compressed by cam 52 through follower 71, valve 69 closes the return of passage 68. The release of the spring by the cam effects unseating of valve 69 under the greater pressure of the engine oil in the filter circuit and the oil in such circuit then merely circulates through the pump and filter. The atmospheric pressure on the diaphragm 42 and the force of springs 33 are enough to overcome the force in spring 70 when uncompressed by cam 52.

When the passage 68 is closed, the engine oil in the filter circuit then flows through passage 72 in valve body 11 to diaphragm 42. The pressure of the oil in the filter circuit forces the diaphragm away from retainer plate 14 and shifts flange 31 with hub 30 thereof and pulley 35 outwardly to engage rotating pulley 35 with clutch plate 39 to rotate the pump shaft 19.

The upper cam 51 and the lower cam 52 are off-set radially from each other on control shaft 43 so that the lower cam seats valve 69 and closes off circulation of filter circuit oil through the pump to operate diaphragm 42 only when piston 6 is being raised.

The diagrammatic views in Figs. 7, 8, 9 and 10 illustrate the operation of the cams and the pump and the several oil systems employed. Fig. 7 is a normal position with ram piston 6 down. Fig. 8 shows the piston being raised. Fig. 9 illustrates a hold position of the piston and Fig. 10 shows the piston being lowered.

In the position of the parts as illustrated in Fig. 7, pin 44 is in a central position as respects the groove 45 of control shaft 43. This position of the pin is the same as that in Fig. 3. Piston 6 is in a lowered position. Relief valve 59 is seated and the cam valve 61 is seated under the position of upper cam 51 compressing cam spring 62. As respects the engine oil system the engine pump 73 is pumping oil from sump 66 through two separate circuits, one the filter circuit through filter 64, pipe 65, valve body passage 68 and thence back to sump 66 through return pipe 67 and the other the lubrication circuit (not shown). Lower cam 52 is rotated to a position where cam spring 62 is released so that the oil pressure of the filter circuit has unseated cam valve 69 and permits the engine oil in such circuit to return to sump 66 as described. Diaphragm 42 is not under pressure so that pulley 35 idles on shaft 19 and the pump gears 22 and 23 are not pumping oil.

In Fig. 8 the piston 6 is being raised. The lower cam 52 has been rotated to a position where valve 69 is seated and the filter circuit oil flows to diaphragm 42 to expand the same and shift pulley 35 into engagement with plate 40 to rotate shaft 19. This starts gears 22 and 23 rotating to pump hydraulic oil to the ram. Valve 59 is unseated for oil to pass to the ram. The upper cam 51 has been rotated to a position to maintain cam valve 61 seated to prevent return of oil to the pump sump 53 through passage 58.

In Fig. 9 the piston is in a hold position. The lower cam 52 has been rotated to a position where valve 69 is unseated and filter circuit engine oil circulates freely through the pump. Diaphragm 42 is released so that pulley 35 rotates freely and shaft 19 and the pump gears are out of operation. Relief valve 59 is closed and the upper cam valve 61 is seated under the position of upper cam 51, to prevent return of oil to sump 53.

In Fig. 10 the piston 6 is being lowered. The lower cam 52 has been rotated to a position where valve 69 is unseated and filter circuit engine oil circulates freely through the pump. Diaphragm 42 is released so that pulley 35 rotates freely and shaft 19 and the pump gears are out of operation. Relief valve 59 has closed passage 55 and the upper cam valve 61 is moved to a position under the rotary position the upper cam 51 has taken, to permit return of hydraulic oil from the ram to the pump sump 53.

Oil for the pump sump 53 is supplied through the tube 74 on the top of pump casing 10 and which is closed by the cap assembly 75.

The invention provides a hydraulic power unit for operating hydraulic cylinders or rams using the power of an internal combustion engine of a vehicle like a dump truck and having a pump which is connected by a hydraulically operated clutch to such engine. The gears of the pump only rotate when oil is actually being pumped to the ram. Although the drawing illustrates the invention as applied to the ram of a dump truck it is also contemplated that other hydraulic cylinders and hydraulic motors or other hydraulic devices may also be operated with the same system.

The control shaft with the offset cam surfaces provides a simple control means for operating both the pump and clutch from a single shaft.

Various embodiments of the invention may be employed within the scope of the accompanying claims.

I claim:

1. In combination with a hydraulic power unit adapted to intermittently actuate a device, and an internal combustion engine having a normally unobstructed oil circuit operated from a source of pressure independently of said hydraulic power unit, a hydraulically actuated clutch between said unit and engine to transmit power from said engine to said unit, a servomotor for operating said clutch, valve means movable to a position blocking fluid flow through a portion of said oil circuit, and an open fluid conduit between said circuit and said servomotor, said conduit being connected to said circuit between said source of pressure and said valve means, whereby movement of said valve means to its blocking position increases the fluid pressure in said conduit to actuate said clutch.

2. The combination according to claim 1, further provided with second valve means for controlling the output of said hydraulic power unit, and a common control for operating both of said valve means.

3. In a hydraulic power unit adapted to be operated by the rotative power supplied by an internal combustion engine, a casing, a shaft rotatably supported in said casing, hydraulic pumping means in said casing operatively connected to said shaft, a driven clutch member carried by said shaft, a driving clutch member rotatably carried by said shaft, resilient means for normally maintaining said clutch members disengaged, diaphragm means carried by said casing and operable in one direction to engage said clutch means, a valve body provided with a first passage for receiving fluid under pressure from an outside source and directing said fluid to said diaphragm and to a discharge opening, a first valve in said body for closing said discharge opening whereby pressure is applied to said diaphragm, a second passage in said body for receiving fluid under pressure from said pumping means and directing said fluid to a power opening and a return opening, a second valve in said body for closing said return opening whereby pressure is applied at said power opening, and means for operating said valves.

4. In a hydraulic power unit adapted to be operated by the rotative power supplied by an internal combustion engine, a casing, a shaft rotatably supported in said casing and having an end projecting therefrom, hydraulic pumping means in said casing operatively connected to said shaft, a clutch member carried by said end outside of said casing, a pulley rotatably carried by said end, said pulley having a clutch member engaging area, spring means for normally maintaining said member and said area disengaged, an expansible diaphragm carried outside of said casing adjacent said pulley, said diaphragm being operable by hydraulic pressure in one direction to engage said member and said area, a valve body in said casing provided with a first passage for receiving oil under pressure from an outside source and directing said oil to said diaphragm and to a discharge opening, a first valve in said body for closing said discharge opening whereby pressure is applied to said diaphragm, a second passage in said body for receiving hydraulic oil under pressure from said pumping means and directing said hydraulic oil to a power opening and a return opening, a second valve in said body for closing said return opening whereby pressure is applied at said power opening, and means for operating said valves.

5. In a hydraulic power unit including a pump and a pulley by which power is supplied to said pump and a hydraulically operated clutch between said pump and said pulley, a valve body provided with a first passage for receiving fluid under pressure from an outside source and directing said fluid to said clutch and to a discharge opening, the passage to said clutch being always open, a first valve in said body movable between a first position closing said discharge opening whereby pressure is applied to said clutch, and a second position connecting said discharge opening and said outside source, a second passage in said body for receiving fluid under pressure from said pump and directing said fluid to a power opening and a return opening, a second valve in said body for closing said return opening whereby pressure is applied at said power opening, and means for operating said valves.

6. In a hydraulic power unit including a pump and a pulley by which power is supplied to said pump and a hydraulically operated clutch between said pump and said pulley, a valve body provided with a first passage for receiving oil under pressure from an outside source and directing said oil to said clutch and to a discharge opening, a first valve in said body for closing said discharge opening whereby pressure is applied to said clutch, a second passage in said body for receiving hydraulic oil under pressure from said pump and directing said hydraulic oil to a power opening and a return opening, a second valve in said body for closing said return opening whereby pressure is applied at said power opening, means for operating said valves, springs to bias said valves toward closed positions with insufficient force to keep said valves closed against pressures slightly greater than atmospheric, and a control shaft provided with cam members operatively connected with said springs, said cam members upon rotation of said shaft selectively applying enough tension on said springs to hold said valves closed against normal operating pressures.

7. A hydraulic power unit as claimed in claim 6, in which said shaft is spring-biased to a neutral position with said first valve unloaded and said second valve loaded.

ELMER O. DALE.

References Cited in the file of this patent
UNITED STATES PATENTS

| Number | Name | Date |
|---|---|---|
| 1,116,998 | Compton | Nov. 10, 1914 |
| 1,223,741 | Schwister | Apr. 24, 1917 |
| 1,251,399 | Mayer et al. | Dec. 25, 1917 |
| 1,376,411 | Eaton | May 3, 1921 |
| 1,536,264 | Pardee | May 5, 1925 |
| 1,638,009 | Cambessedes | Aug. 9, 1927 |
| 1,788,027 | May | Jan. 6, 1931 |
| 2,414,359 | Carnagua et al. | Jan. 14, 1947 |